United States Patent [19]

McArthur

[11] 3,898,877

[45] Aug. 12, 1975

[54] METHOD AND APPARATUS FOR MEASURING PRESSURE RELATED PARAMETERS

[75] Inventor: Billy W. McArthur, Houston, Tex.

[73] Assignee: Sperry-Sun Well Surveying Company, Sugar Land, Tex.

[22] Filed: Nov. 8, 1973

[21] Appl. No.: 414,062

Related U.S. Application Data

[63] Continuation-in-part of Ser. No. 209,856, Dec. 20, 1971, abandoned.

[52] U.S. Cl................................. 73/151; 73/388 R
[51] Int. Cl........................................... E21b 47/06
[58] Field of Search.......... 73/388 R, 151, 300, 302, 73/301, 299, 389

[56] References Cited
UNITED STATES PATENTS

| | | | |
|---|---|---|---|
| 1,946,175 | 2/1934 | Murphy et al. | 73/299 |
| 2,645,128 | 7/1953 | Walker et al. | 73/388 R |
| 2,791,119 | 5/1957 | Zinn et al. | 73/302 X |
| 3,572,121 | 3/1971 | Kesseru et al. | 73/302 |
| 3,712,129 | 1/1973 | Rhoades | 73/151 |

Primary Examiner—Jerry W. Myracle
Attorney, Agent, or Firm—George L. Church; Donald R. Johnson; John E. Holder

[57] ABSTRACT

A system for remotely measuring pressure includes an expansible chamber for placement in the remote location where pressure is to be determined. A pressure measuring device for detecting pressure variations is connected to the chamber by means of a tube. A fluid is passed through the tube into the chamber and by detecting predictable variations in pressure build-up in the chamber, important pressure parameters at the remote location can be determined.

12 Claims, 4 Drawing Figures

PATENTED AUG 12 1975　　3,898,877

SHEET 1

3,898,877

METHOD AND APPARATUS FOR MEASURING PRESSURE RELATED PARAMETERS

This is a continuation-in-part of the application designated as Ser. No. 209,856, entitled METHOD AND APPARATUS FOR MEASURING PRESSURE, filed Dec. 20, 1971, now abandoned.

BACKGROUND OF THE INVENTION

There are many instances of situations where it is desirable to measure changes in pressure at a remote location. One of the most obvious and also most important applications for such devices is in wells producing a fluid from underground formations, where formation pressure is a factor. In particular, application is found in oil and gas producing wells.

In the analysis of most production and reservoir engineering problems, reliable reservoir pressure together with other basic production and geological data is essential. In recent years, the oil industry has through extensive research efforts developed many methods and techniques for utilizing pressure data in evaluating problems of petroleum production. For example, reliable bottom hole pressure information is essential to implement and maintain secondary recovery operations. In such operations, periodic pressure observations are used to determine fill up requirements, location of flood fronts, sweep efficiencies, well productivity potential, etc. In addition, bottom hole pressure measurements are used to determine the occurrence of wellbore damage and operational problems in pumping wells. In any event, there are many applications for use of pressure data in efficiently producing petroleum reservoirs.

In petroleum production operations bottom hole pressure data may be provided on a permanent basis or may be determined over short periods of time by running in pressure instruments periodically. Often times, it is inconvenient and very expensive to take such data on a periodic basis, since normally the well must be shut in or producing equipment must be removed to facilitate the running in of instrumentation for taking pressure data. In order to overcome these problems permanent pressure measuring devices have been devised for installation in producing wells. One such device operates with a downhole pressure transducer having an electronic scanning system for converting the downhole pressure into data transmittable to the surface by means of a conductor cable. The cable is normally applied or attached to the outside of the tubing with the transducer being mounted on the lower end of the tubing string. The electronics in such a system are expensive and produce maintenance problems. In addition, an electronic system using scanners and transmitting such data over conductors is subject to problems of maintaining a high resolution and thus data may not be as accurate as that needed to determine changes in reservoir conditions. Also, conductor cable deteriorates with time and is often subject to chemical reaction with wellbore fluids. Another problem is the temperature limitations of electronic instrumentation which are sometimes exceeded in deep or high temperature wells.

It is therefore an object of the present invention to provide a new and improved apparatus for remotely detecting pressure.

SUMMARY OF THE INVENTION

With these and other objects in view, the present invention contemplates a pressure system involving an expansible chamber located at the place where the pressure is to be monitored and connected with a pressure measuring device by means of a tube. A fluid is passed through the tube into the expansible chamber and by monitoring the rate of pressure build-up of the fluid, pressure parameters at the remote location may be determined.

DESCRIPTION OF THE PREFERRED EMBODIMENTS

Figure 1:
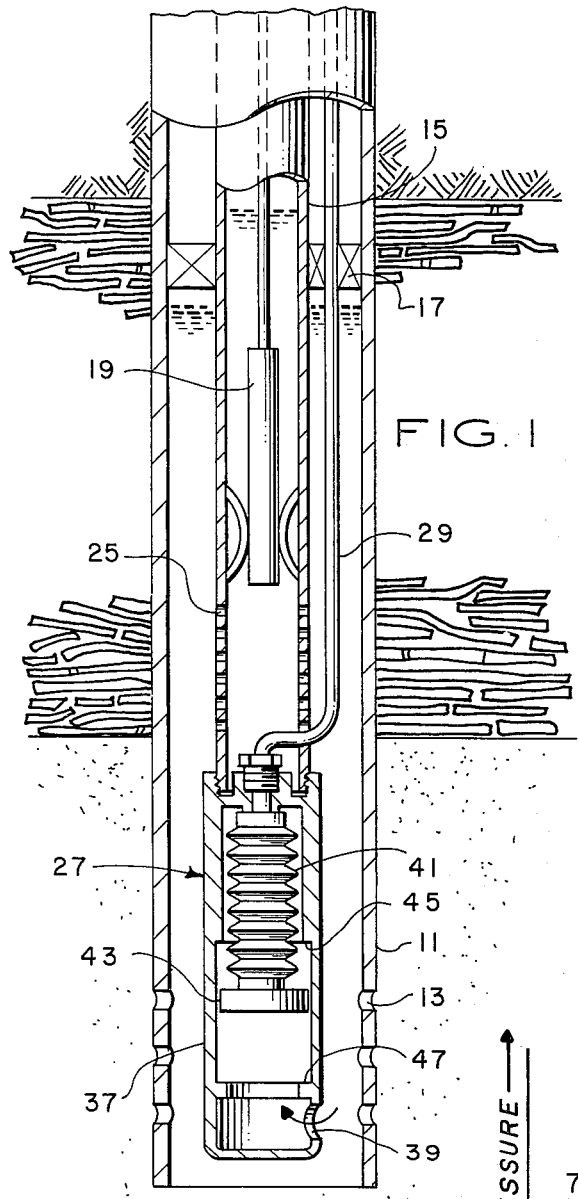
FIG. 1 is a schematic drawing of a wellbore and production equipment including a pressure measuring system in accordance with the present invention.

Referring first to FIG. 1 of the drawings a wellbore is shown traversing underground formations. Production equipment for producing fluids from the formations is shown schematically and includes a casing 11 in the wellbore having perforations 13 at its lower end to permit the entry of formation fluid. A tubing string 15 extends from the well head at the surface downwardly within the borehole to the lower end thereof. A packer 17 is positioned about the tubing and extends between the tubing and the casing of the wellbore. A downhole pump 19 is schematically shown positioned within the tubing and is connected to a pumping unit 21 at the surface by means of rods 23. A ported section 25 in the tubing string permits the entry of wellbore fluids for pumping to the surface. A downhole pressure measuring device 27 is shown positioned on the lower end of the tubing. A small diameter tube 29 extends from within the pressure measuring device to the outside of the tubing string and to the surface where it exits from the side of the casing through a fitting 31. Connected to the tube 29 at the surface is a fluid pumping device 33 and a pressure indicating device 35.

The downhole pressure measuring device 27 is shown in FIG. 1 attached to the bottom end of the tubing string and includes an outer housing 37 having a fluid inlet port 39 at its lower end for permitting the entry of wellbore fluids. The device is coupled to the lower end of the tubing string by means of a threaded coupling or the like and the tube 29 extending to the surface communicates with the upper end of the pressure measuring apparatus 27. A bellows 41 is positioned within the interior bore of the housing. The upper end of the bellows is connected to the tube 29 with the interior of the bellows communicating with the tube. The bellows may be constructed of a rubber or metallic material which is constructed to permit its flexible extension and compression within the housing. A bellows block 43 is attached to the lower end of the bellows and seals the lower end of the bellows. A first shoulder 45 formed within the housing interior provides an upper limit for movement of the bellows block 43 to limit the degree to which the bellows may be compressed. A second shoulder 47 formed at the lower end of the housing interior likewise acts as a limiting block for downward movement or extension of the bellows.

In the operation of the apparatus of FIG. 1, after the device has been positioned in the wellbore at a point to measure pressure, fluid is introduced into the tube 29 by means of pump 33 at the surface and such fluid is transmitted to the downhole apparatus. The passage of fluid into the tube 29 and subsequently into the bellows 41 continues until the bottom hole pressure of the wellbore is reached by the fluid within the tube and bellows. At this point, the bellows 41 will begin to expand with such expansion taking place until the bellows block 43 reaches the lower shoulder 47 within the housing whereupon a pressure increase will be seen at the surface as the pressure within the bellows and tube increases. Wherein the pressure at gauge 35 will have increased at a substantially even rate as the pressure in this system was increased to approach the bottom hole pressure, there will be very little increase in pressure as the bellows moves from the upper shoulder 45 to the lower shoulder 47. This scheme of detecting the changing pressure rate will be more particularly described with respect to FIG. 2 and 3 of the drawings.

Figure 2:
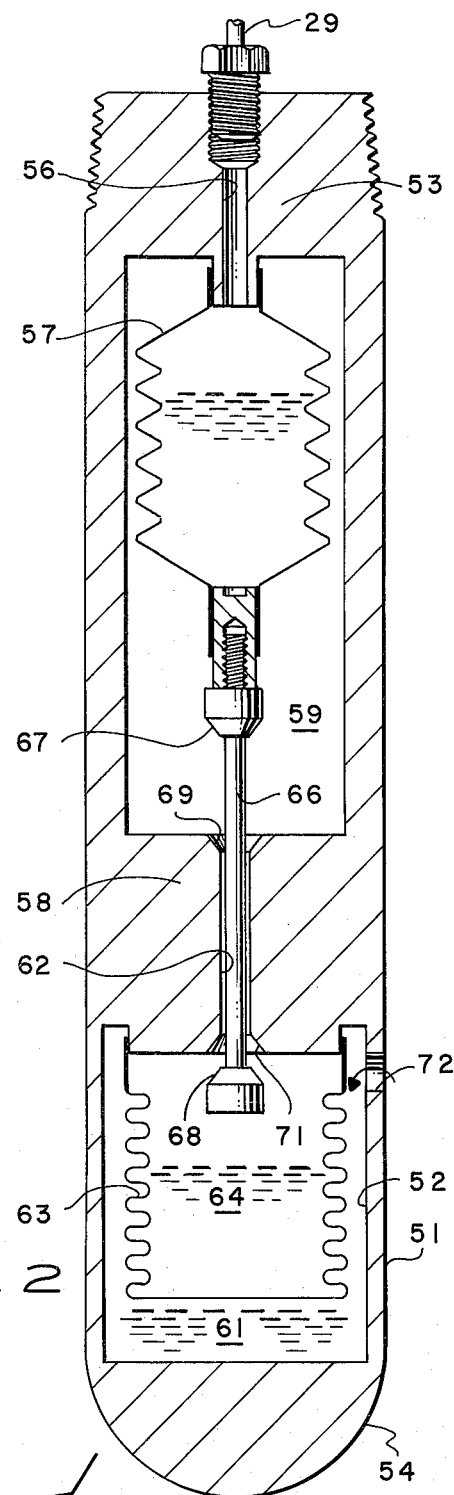
FIG. 2 shows an alternative pressure measuring system.

Referring now to FIG. 2 of the drawings another embodiment of the pressure measuring device is shown in greater detail and includes a housing 51 having a hollow interior bore 52 closed at its top and bottom ends 53 and 54 respectively. The upper end 53 is threaded for connection to the tubing string 15. An opening 56 through the top end 53 of the housing extends into the interior bore for communication with an upper bellows 57 which is attached to the upper end 53 of the housing forming a fluid tight seal between the bellows and housing. The bellows may be constructed of rubber or for high temperature applications, metal may be used. Normally, rubber would be the preferred material because it is less likely to be damaged by collapse of the bellows. A block 58 is formed within the interior bore of the housing midway along its length dividing the interior of the housing into upper and lower chambers 59, 61 respectively. A longitudinal bore or passage 62 extends through the block 58 and connects the upper and lower chambers. A lower bellows 63 is sealingly connected to the lower end of the block 58 and extends downwardly therefrom into the lower chamber 61. The upper chamber 59, interior 64 of the lower bellows and connecting passage 62 are filled with a fluid. The upper bellows 57 has a rod 66 attached thereto and extending downwardly through the longitudinal passage 62 in the block. The rod is sized to permit its loose fit within the opening 62 and thus the passage of fluid through the opening with the rod in place. Upper and lower beveled shoulders 67, 68 respectively, are formed on the rod with the beveled surfaces facing each other. Complimentary seating surfaces 69, 71 also beveled, are formed in the upper and lower ends respectively of the block to provide a valve and seat arrangement when the beveled shoulders are engaged with the seating surfaces. An opening 72 in the side of the housing communicates with the lower chamber 61 whereas the opening 56 in the upper end of the housing is arranged for communication with the tube 29 to the surface.

In the operation of the apparatus described above, the pressure measuring device is lowered into the wellbore. In a permanent installation this is done by connecting the housing 51 to the lower end of the tubing string and running the tubing string into a wellbore. The small diameter tube 29 which connects the pressure measuring apparatus to the surface may be run into the well as the tubing string and apparatus are lowered into the well. Such small diameter tubing may be mounted on a spool and fed out as the tubing string is lowered into the wellbore. The tubing 29 may be made of a steel or other metallic material or from synthetic plastic materials which would be compatible with wellbore fluid and temperature conditions.

In temporary installations, the pressure measuring device may be lowered into the wellbore by means of the connecting tubing which in such case would act as a strength member for supporting the pressure measuring device housing within the wellbore. Alternatively the apparatus can be lowered into a well on a wire line.

In the operation of the apparatus of FIG. 2, as the device is lowered into the wellbore, wellbore fluid enters the lower chamber 64 through the opening or port 72 in the side of the tool housing. This causes the pressure to increase in the lower chamber 64 which pressure increase is communicated by means of the lower bellows 63 to the fluid within the interior 64 of the bellows and by means of the longitudinal opening 62 to the fluid in the upper chamber 59. This causes the bellows 57 in the upper chamber to collapse, moving the rod 66 upwardly until the beveled shoulder 68 has positioned itself within the seating surface 71 at the lower end of the block 58, thus, restricting further upward movement of the rod and closing off the lower end of passage 62. When this occurs, the lower bellows 63 will cease to collapse thus preventing the lower bellows from being crushed as the pressure in the wellbore increases.

When the apparatus is positioned in the wellbore at a point where pressure is desired to be measured, a fluid is introduced into the tubing 29 at the surface at a steady rate by means of pump 33. The fluid may be a liquid or a gas having a known density and compressibility. As fluid is introduced into the tube 29 and thus the upper bellows 57, the pressure in the upper bellows will eventually reach the level of the formation pressure acting on the rod 66 and as it exceeds the formation pressure, the upper bellows will begin to expand and thereby unseat the lower valve or beveled shoulder 68. When the lower valve unseats and as the rod 66 moves downwardly, there will be a slight pressure increase in the pressure being measured at the surface at gauge 35 as fluid continues to be introduced into the tube 29. This slight pressure increase in the system is due to the work being done to expand the upper and lower bellows. When the upper bellows sufficiently expands, the rod has moved downwardly to the extent necessary to place the upper beveled shoulder 67 in its mating seating surface 69. This prevents further downward movement of the rod and bellows 57 and also seals the upper end of passage 62. Sealing of the passage causes pressure on either side of the bellows 57 to equalize thus preventing the rupture of bellows 57. When the upper valve seats, the further introduction of fluid into the tubing 29 at the surface will cause a sharp increase in pressure being measured at the surface.

Figure 4:
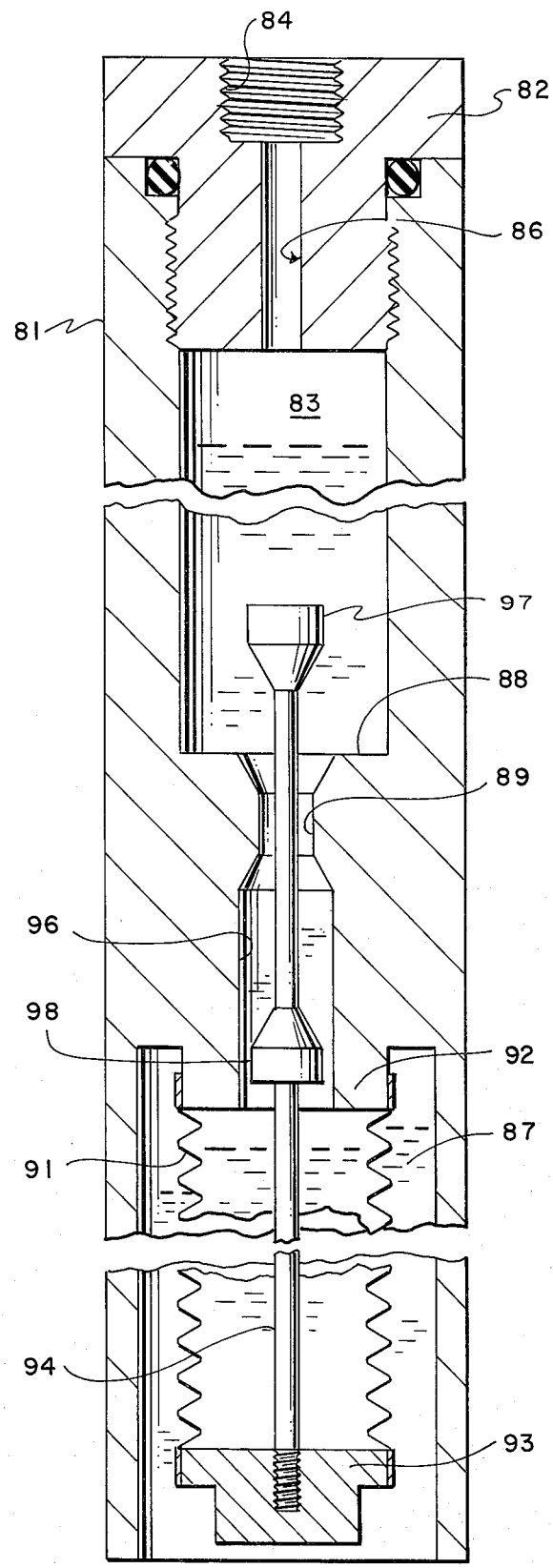
FIG. 4 is an alternative pressure measuring probe.

Referring now to FIG. 4 of the Drawings another downhole pressure measuring probe is shown having a housing 81 which is sealingly closed at its upper end by means of a plug 82, threadably received within an interior bore of the housing 81 to form a chamber 83 in the upper end of the housing. The upper end of the plug 82 has a threaded recess 84 for receiving a fitting at the lower end of the tube 29 to provide fluid communication between the chamber 83 and tube 29. O-ring seals are shown for sealing the plug 82 within the housing. A passage 86 extends from the recess 84 into the chamber 83. At the lower end of the housing 81 the exterior walls partially enclose a lower chamber 87 which is open at its lower end to the borehole environment. An inwardly projecting shoulder 88 is formed midway along the length of the housing to divide the interior bore of the housing into the separate chambers 83 and 87. A restricted passage 89 is formed through the shoulder portion to provide a fluid communication path between the chamber 83 and the interior of a hollow bellows 91 which projects downwardly from the shoulder 88 into the chamber 87. The bellows 91 is sealingly engaged at its upper end to a downward projection 92 on the shoulder 88. The interior of the bellows 91 is sealed from fluid communication with the exterior of the bellows. At the lower end of the bellows is an end portion 93 which seals the lower end of the bellows. A rod 94 extends from the lower end plug 93 upwardly through the bellows, through an enlarged passage 96 in the shoulder 88, through the restricted opening 89 and upwardly into the chamber 83 above the shoulder 88. Upper and lower valve seats 97 and 98 respectively are positioned on the rod 94 and are shaped to sealingly mate with complimentary shaped valve surfaces on the upper and lower ends of the restricted passage 89.

In the operation of the downhole pressure probe described above, when the apparatus is lowered into the wellbore, the lower valve seat 98 is moved into engagement with the complimentary seat at the lower end of the passage 89 in response to downhole pressure being greater than the ambient pressure at the surface to thereby collapse the bellows 91 thus moving the rod 94 upwardly to close passage 89. Upon placement at the desired location in the wellbore for measuring pressures, fluid pressure is applied to the tube 29 at the surface until such fluid pressure in the tube 29 reaches the downhole pressure in the borehole whereupon as the tube pressure exceeds such downhole pressure, the bellows 91 is expanded against the wellbore fluids to move the rod 94 downwardly thus opening the lower end of the passage 89. Should the application of pressure to the tube 29 continue after such downhole pressure is reached, eventually the rod 94 would move with the bellows 91 downwardly until the upper valve seat 97 engaged the upper end of the passage 89 to close off the upper end. Thus in order to provide an operable system when such bottom hole pressure is reached, as will be hereinafeer described, pressure is apppied to the tube 29 in excess of such downhole pressure to the extent that it will open passage 89 by movement of the rod 94 downwardly preferably until the valve seats 97 and 98 are equadistantlly positioned on opposite sides of the passage 89 thereby permitting a range of movement of the rod and thus a range of pressure measurement within the system.

Figure 3:
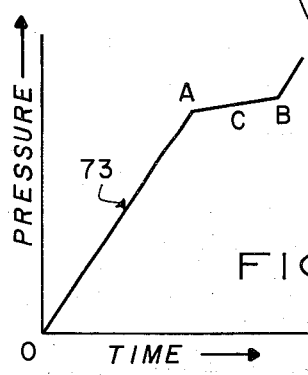
FIG. 3 is a graphical representation of how pressure fluctuations at the surface may be used to determine downhole pressure parameters.

In order to demonstrate the applicability of the system this far described in measuring downhole pressures, reference is now made to FIG. 3 of the drawing. FIG. 3 shows a plot of pressure being applied at the surface along the vertical scale against time units required to pressure up the system at a constant rate on the horizontal scale. When the tool is seated in the wellbore at the location for measuring pressure and before fluid is introduced into the system, the pressure measured at the surface will be at the zero pressure, zero time position. Due to formation pressure, the rod 66 should have moved upwardly to close the lower end of passage 62. As fluid is introduced into the tubing 29 at the surface, the pressure being measured at the surface will begin to rise as represented by the sloping line 73 of the graph. If the introduction of fluid is at a constant rate, the pressure increase will also be at a constant rate. When the pressure within the system exceeds the bottom hole pressure of the wellbore, (Point A of FIG. 3) the lower valve will open whereupon fluid will pass into the lower bellows and the rate of pressurization will decrease to a much lower rate of increase; i.e., the rate which is necessary to expand the upper and lower bellows 57, 63. This rate is represented by the slope of line 73 between points A and B of FIG. 3.

Eventually, the upper bellows will have expanded sufficiently to close the upper end of passage 62 by the mating of shoulder 67 with surface 69 whereupon a sharp increase in surface pressure will begin (Point B). At this time sufficient fluid may be removed from the system at the surface to drop the pressure to a point C, for example, midway between points A and B. This should place the rod 66 at a position such that the upper and lower valve seats are equidistant from the upper and lower ends respectively of the passage 62 in block 58. This in turn will permit fluctuations of bottom hole pressures to be measured by the gauge 35 at the surface. Of course, if a downward trend in bottom hole pressure were expected, the system could be stabilized so as to permit a greater range in downward trending pressure to be messured, i.e., the rod 66 would be left in a more downward position relative to passage 62.

It is readily seen how the description of the system operation is applied to the apparatus in FIG. 4 similarly to that described above with respect to FIGS. 1 and 2 and therefore the description will not be repeated.

In order to accurately determine the initial pressures, such as bottom hole pressure at point A, it may be desirable to utilize a standard pressure measuring system of known accuracy to determine such initial pressures. Then the standard measuring system would be removed and differential pressures based on such initial pressures could then be determined from the present system.

While the pressure measuring system disclosed herein has been described in conjunction with oil field production operations and with respect to certain materials for use in the system, it is readily seen that the system has application to other types of pressure measuring operations. In addition, while particular embodiments of the present invention have been shows and described, it is apparent that changes and modifications may be made without departing from the spirit of this invention in its broader aspects, and therefore, the aim in the appended claims is to cover all such changes and modifications as fall within the true spirit and scope of this invention.

What is claimed is:

1. A method for determining pressure related parameters of an environment and indicating such changes at a remote location, including the steps of: placing an expansible chamber in the environment where pressure parameters are to be determined, the exterior of such chamber being in communication with the environment, placing an enclosed passageway between the chamber and the remote location with one end of such passageway in sealed communication with the chamber and the other end of such passageway in sealed communication with a pressure responsive apparatus for detecting pressure changes, such other end also being in communication with a fluid supply means, introducing a fluid into the passageway and chamber, and detecting the pressure at which characteristic changes occur in the rate of pressure increase in the passageway and chamber to determine parameters of pressure in the environment.

2. The method of claim 1 and further including detecting by means of the pressure responsive apparatus, at what pressure the expansible chamber begins to expand due to the introduction of fluids into the passageway and chamber, to determine ambient pressure of the environment.

3. The method of claim 1 wherein the expansible movement of such chamber is limited and further including determining the limits of such movement, adjusting the amount of fluid in the passageway and chamber; and optimizing by said adjustment movement of the chamber with respect to pressure changes to be measured.

4. The method of claim 1 wherein the introduction of fluid into the passageway and chamber is at constant rate and further including, detecting changes in the rate of pressure increase to determine parameters of pressure in the environment.

5. A method for determining parameters of fluids with a borehole, including, placing an expansible chamber in the borehole, such chamber having limits of movement, passing a fluid within a closed system from the surface into the chamber at a constant rate, and detecting the pressure at which characteristic changes occur in the rate of pressure increase to determine parameters of borehole fluids.

6. Apparatus for determining pressure related parameters in one environment and for providing indications of same at a remote location, including a housing having two chambers therein and a longitudinal opening between the chambers, expansible bellows in one of the chambers and secured to the housing, a rod in the opening and secured to the bellows, said rod having means for sealing the opening, pressure indicating means at such remote location, closed passageway means having one of its ends in communication with said pressure indicating means to form a closed fluid system, a fluid supply means for introducing a fluid into said closed fluid system.

7. The apparatus of claim 6 wherein said fluid supply means is located at said remote location.

8. The apparatus of claim 6 wherein said fluid supply means further includes means for introducing fluid into said closed fluid system at a constant rate.

9. The apparatus of claim 6 further including means for limiting the movement of said expansible chamber means.

10. A method for determining pressure related parameters of a borehole environment and indicating such changes at a remote location, including the steps of: placing an expansible chamber in the borehole, such chamber having limits of movement and being in fluid communication with the surface, passing a fluid between the surface and the chamber at a constant rate, detecting a rate of change of pressure of the fluid to determine movement of the chamber between its limits, passing the fluid between the surface and the chamber to place the chamber at a desired position between its limits of movement, and subsequently detecting the pressure at which characteristic changes occur in the rate of pressure increase of the fluid at the surface.

11. A method of measuring downhole pressure related paremeters in a borehole including the steps of: running a tube from the surface into a borehole, said tube having means to prevent the flow of downhole fluids into a downhole end of the tube; applying fluid pressure to the surface end of tube at a controlled rate; detecting the pressure at which a deviation occurs in the controlled rate of change of pressure, ceasing the application of pressure to the surface end of the tube, thereafter measuring the pressure of the fluid at the surface end of the tube.

12. The method of claim 11 wherein such a chamber has limits of movement in opposite directions and further including passing the fluid into the chamber until such chamber has reached its limit of movement in a first direction and subsequently passing fluid out of the chamber to move such chamber in a second direction until such chamber is at a position between its limits of movement.

* * * * *